United States Patent
Gopalakrishnan et al.

(10) Patent No.: US 12,501,297 B1
(45) Date of Patent: Dec. 16, 2025

(54) DYNAMICALLY DETERMINING TIME ERROR PERFORMANCE ISSUES IN A SYNCHRONIZATION NETWORK BY A MONITORING SYSTEM

(71) Applicant: Juniper Networks, Inc., Sunnyvale, CA (US)

(72) Inventors: Kamatchi S. Gopalakrishnan, Dublin, CA (US); Manish Talwar, Lunenburg, MA (US); Sumeet Mundra, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 532 days.

(21) Appl. No.: 18/148,235

(22) Filed: Dec. 29, 2022

Related U.S. Application Data

(60) Provisional application No. 63/380,693, filed on Oct. 24, 2022.

(51) Int. Cl.
*H04W 24/08* (2009.01)
*H04J 3/06* (2006.01)
*H04W 56/00* (2009.01)

(52) U.S. Cl.
CPC .......... *H04W 24/08* (2013.01); *H04J 3/0661* (2013.01); *H04W 56/001* (2013.01)

(58) Field of Classification Search
CPC .... H04W 24/08; H04W 56/001; H04J 3/0661
See application file for complete search history.

(56) References Cited

U.S. PATENT DOCUMENTS

2023/0361981 A1* 11/2023 Bedrosian ............. H04L 7/0037

* cited by examiner

*Primary Examiner* — Sulaiman Nooristany
(74) *Attorney, Agent, or Firm* — Harrity & Harrity, LLP

(57) ABSTRACT

In some implementations, a monitoring system may obtain reporting data from a node of a plurality of nodes in a synchronization network. The monitoring system may determine, based on the reporting data, relative time error information associated with the node. The monitoring system may determine, based on at least one of the reporting data or the relative time error information, whether the node is associated with one or more time error performance issues. The monitoring system may provide information indicating whether the node is associated with the one or more time error performance issues.

20 Claims, 8 Drawing Sheets

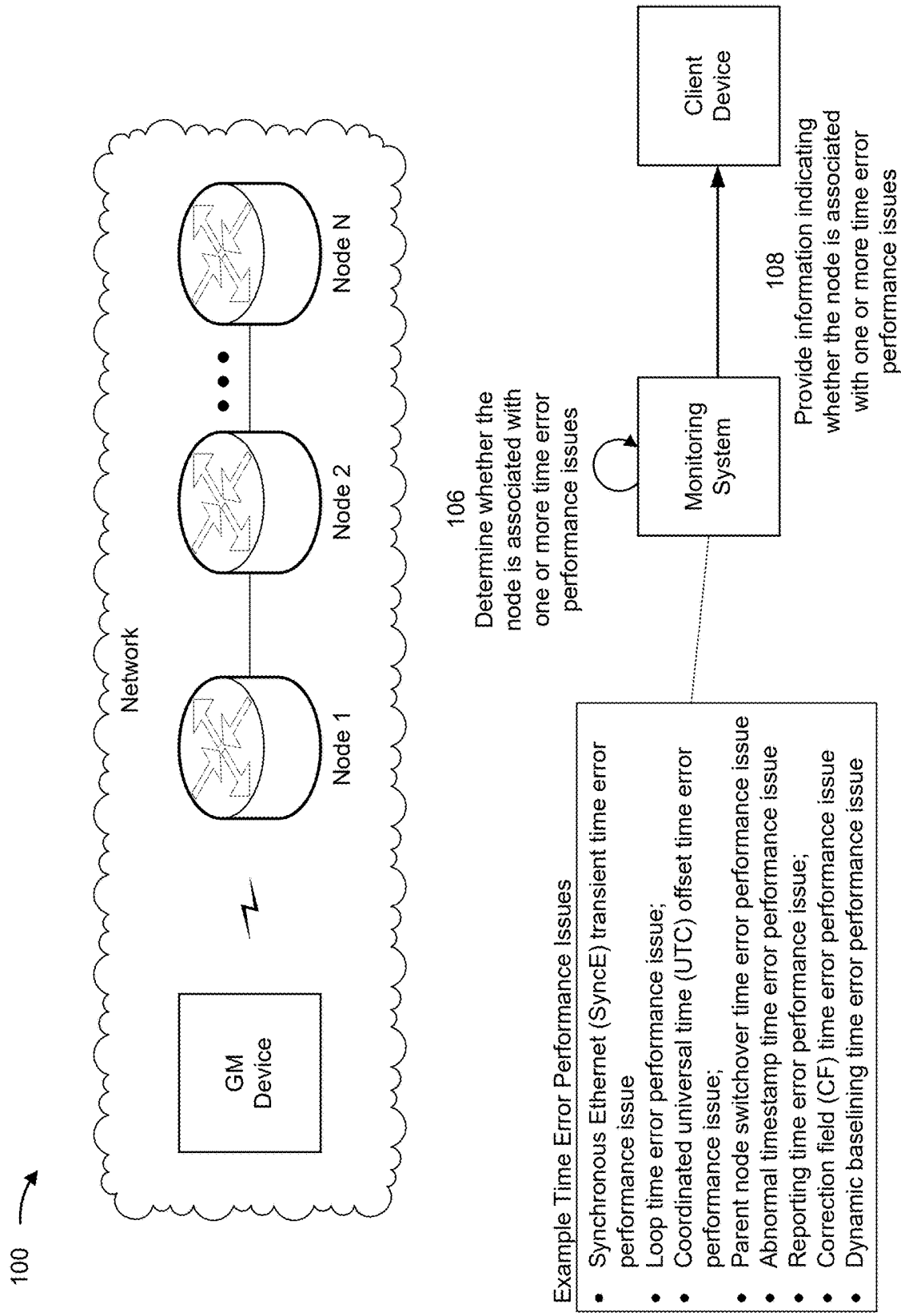

DYNAMICALLY DETERMINING TIME ERROR PERFORMANCE ISSUES IN A SYNCHRONIZATION NETWORK BY A MONITORING SYSTEM

CROSS-REFERENCE TO RELATED APPLICATION

This patent application claims priority to U.S. Provisional Patent Application No. 63/380,693, filed on Oct. 24, 2022, and entitled "DYNAMICALLY DETERMINING SYNCHRONIZATION TIME ERROR AND FAULT DETECTION IN AN END-TO-END SYNCHRONIZATION NETWORK BY A CENTRAL SYSTEM." The disclosure of the prior application is considered part of and is incorporated by reference into this patent application.

BACKGROUND

Precision timing protocol (PTP) may be used to synchronize clocks associated with network devices in a network. When used, PTP may be capable of achieving sub-microsecond clock accuracy.

SUMMARY

In some implementations, a method includes obtaining, by a monitoring system, reporting data from a node of a plurality of nodes in a synchronization network; determining, by the monitoring system and based on the reporting data, relative time error information associated with the node; determining, by the monitoring system and based on at least one of the reporting data or the relative time error information, that the node is associated with one or more time error performance issues; and providing, by the monitoring system, information indicating the one or more time error performance issues.

In some implementations, a monitoring system includes one or more memories; and one or more processors to: obtain reporting data from a node of a plurality of nodes in a synchronization network; determine relative time error information associated with the node; determine, based on at least one of the reporting data or the relative time error information, whether the node is associated with one or more time error performance issues; and provide information indicating whether the node is associated with the one or more time error performance issues.

In some implementations, a non-transitory computer-readable medium storing a set of instructions includes one or more instructions that, when executed by one or more processors of a monitoring system, cause the monitoring system to: obtain reporting data from a node of a plurality of nodes in a synchronization network; determine, based on the reporting data, whether the node is associated with one or more time error performance issues; and provide information indicating whether the node is associated with the one or more time error performance issues.

BRIEF DESCRIPTION OF THE DRAWINGS

FIGS. 1A-1D are diagrams of an example implementation associated with dynamically determining time error performance issues in a synchronization network by a monitoring system.

DETAILED DESCRIPTION

Figure 1A:
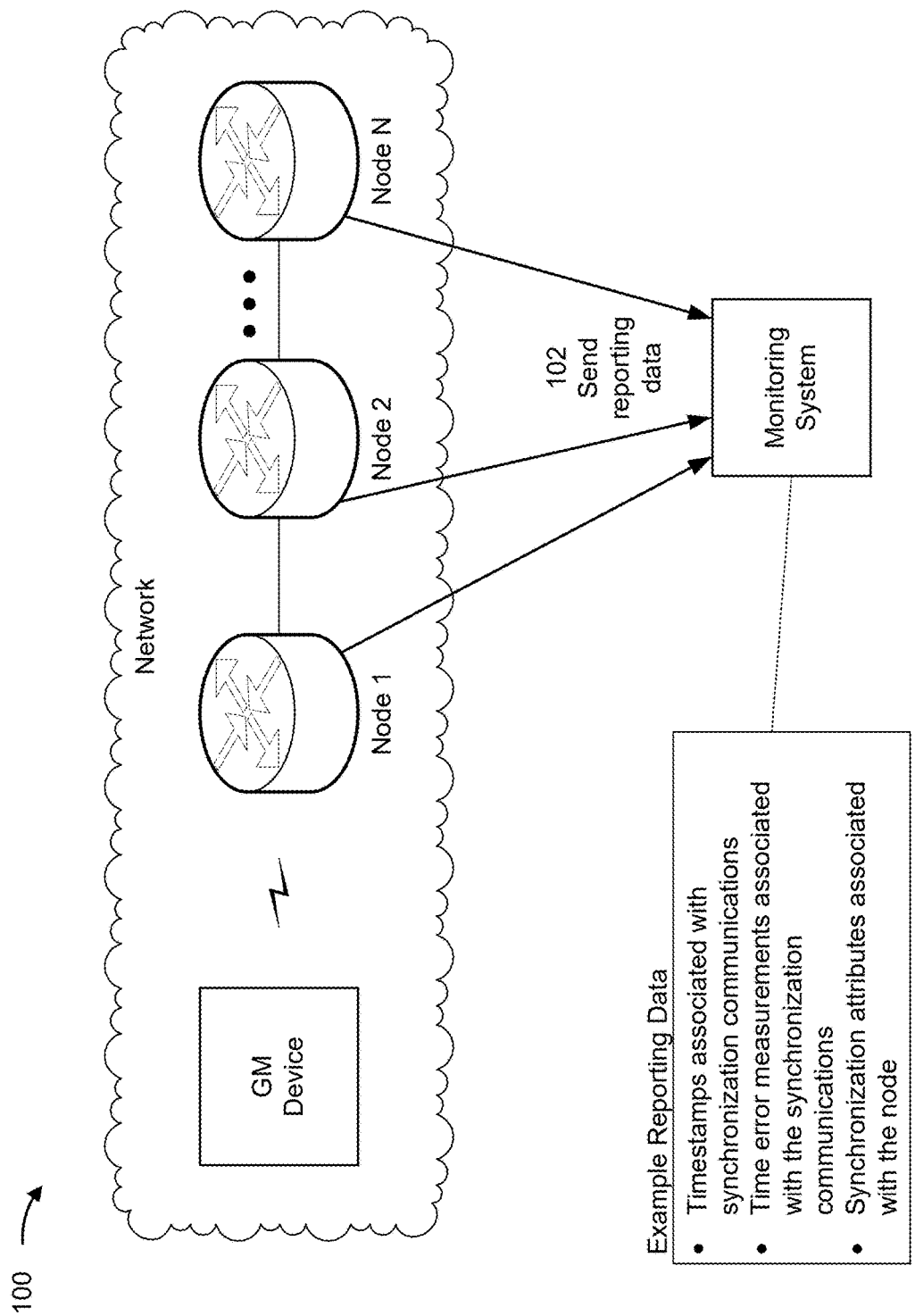

The following detailed description of example implementations refers to the accompanying drawings. The same reference numbers in different drawings may identify the same or similar elements.

Often, there are many (e.g., tens, hundreds, and/or thousands) of nodes (e.g., network devices and/or base stations) deployed in a synchronization network, such as a wireless network (e.g., a 4G or 5G network). Currently, no automated software or algorithmic model is available to understand how time error accumulates (e.g., increases or decreases) from a master clock (GM) of the synchronization network to an end-node (e.g., a radio unit (RU)) of the synchronization network. Further, no centralized model is available to dynamically compute, monitor and report end-to-end time error in the synchronization network.

Moreover, accuracy of a timing signal recovered at an end of a synchronization chain of nodes depends on a combination of respective time errors of the nodes in the synchronization chain. Consequently, a sum of the timing errors introduced at each node along the path needs to be within a specified timing budget. In many cases, network operators rely on external measurement equipment to measure timing error, which involves manual intervention and often does not help to identify a particular node or nodes that cause a time error issue in a synchronization chain. For example, timing errors may be measured by external timing measurement equipment or small form-factor pluggable (SFP)-plugs with a built-in global navigation satellite system (GNSS) receiver. However, this is a manual process. An operator needs to plug the equipment in and measure timing error at every network node, which typically is not practical. Further, this process does not provide an entire network view of relative time-error from one node to another node in a chain of nodes in the synchronization network. Moreover, this process does not detect whether a time error change is triggered by a Synchronous Ethernet (Sync-E) transient issue, or some other reason. Additionally, this process does not detect whether there is any synchronization/timing loop and does not predict what a timing error will be in the future.

Some implementations described herein provide a monitoring system. The monitoring system may obtain reporting data from each node of a plurality of nodes (e.g., that form a synchronization chain) in a synchronization network. The reporting data of each node may include timestamps associated with synchronization communications, synchronization error measurements made by the node, and/or synchronization attributes associated with the node. The monitoring system may thereby determine relative time error information associated with each node (e.g., a constant time error (CTE), and/or another time error). The monitoring system then may identify one or more time performance issues associated with the node. The monitoring system may also determine a cumulative time error associated with the synchronization network.

In this way, the monitoring system is able to dynamically determine time error performance issues (e.g., of one or more nodes) in a synchronization network. That is, the monitoring system may automatically identify, in real-time and based on real-world performance, a faulty or poorly performing node in the synchronization network. Such an automated approach has not yet been attempted in practice. Further, identifying a single node is typically not possible when using external measurement equipment to identify time error performance issues from one end of a chain of nodes in a synchronization to another end. Moreover, the external measurement equipment operates based on testing use cases that may not accurately reflect real-world situations.

Some implementations provide information indicating time error performance issues with a node of the synchronization network. This information can be presented (e.g., via a client device) to an operator of the synchronization network. The operator may therefore perform one or more actions to address time error performance issues, which improves a time error performance of the node and/or the synchronization network device. This thereby improves synchronization of the nodes in the synchronization network, which enables an improved performance of the synchronization network in its ability to provide one or more services, such as a telecommunications service.

Figure 1B:
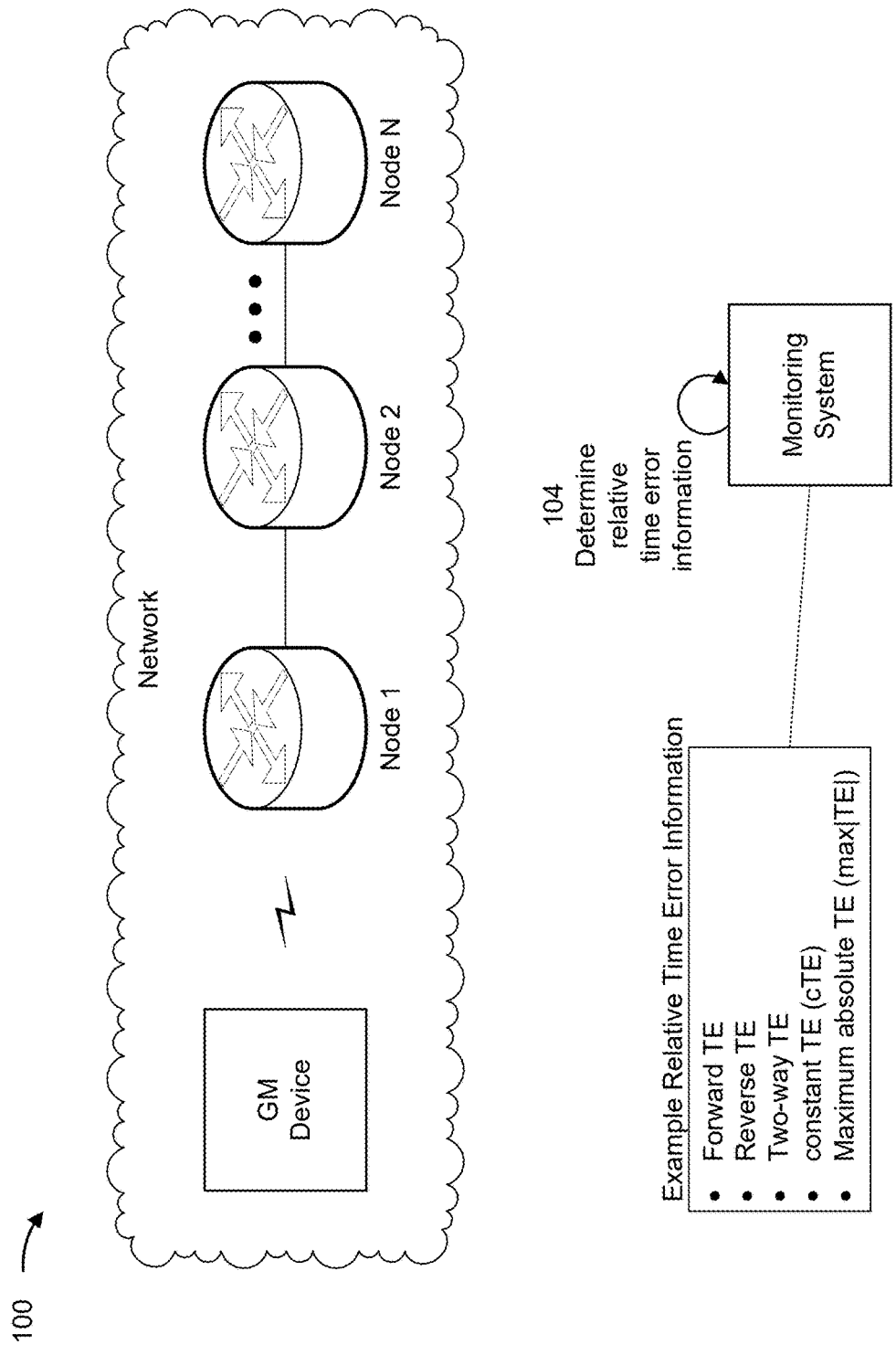

FIGS. 1A-1D are diagrams of an example implementation 100 associated with dynamically determining time error performance issues in a synchronization network by a monitoring system. As shown in FIGS. 1A-1C, example implementation 100 includes a master clock device (a GM device), a plurality of nodes (shown as nodes 1 through N, where N≥2), a monitoring system, and a network (e.g., a synchronization network). These devices and the network are described in more detail below in connection with FIG. 2 and FIG. 3.

As shown in FIGS. 1A-1C, the plurality of nodes may form a synchronization chain of nodes (e.g., from the GM device). Each node in the chain may communicate (e.g., via synchronization communications, such as according to PTP) with a parent node, or the GM device, to obtain timing information to ensure that the node is synchronized (e.g. with the parent node and the GM device). Accordingly, the node and the parent node (or the GM device) may have what is sometimes termed a "master/slave" synchronization relationship. Moreover, each node may be configured to communicate with the monitoring system, as described herein. Although FIGS. 1A-1C, shows the monitoring system outside the network, in some implementations, some or all of the monitoring system may be included in the network.

As shown in FIG. 1A, and by reference number 102, each node of the plurality of nodes may send reporting data to the monitoring system. For example, each node may send the reporting data to the monitoring system as the node identifies and/or determines the reporting data (e.g., in real-time or near real-time). As another example, the node may send the reporting data to the monitoring system on a scheduled basis, on an on-demand basis, on a triggered basis, or on an ad-hoc basis. In this way, the monitoring system may obtain reporting data from each node of the plurality of nodes (e.g., within a same time period).

The reporting data obtained by the monitoring system, from a node of the plurality of nodes, may include, for example, one or more timestamps associated with synchronization communications (e.g., using PTP) between the node and another node of the plurality of nodes (e.g., t1, t2, t3, and t4 timestamps associated with PTP signaling between the node and a parent node, of the plurality of nodes, or the GM device), one or more time error measurements (e.g., a forward time error, a reverse time error, and/or a two-way time error) associated with the synchronization communications (e.g., that are calculated and/or determined by the node), and/or one or more synchronization attributes associated with the node.

The one or more synchronization attributes may include, for example, an identifier of the node attribute (e.g., a Clock-ID attribute, such as a PTP Clock-ID attribute, that uniquely identifies the node); a node type of the node attribute (e.g., a Node-type attribute, such as a PTP Node-type attribute, that indicates whether the node is a GM clock-type node, a boundary clock (BC)-type node, or an ordinary clock (OC)-type clock); a state of the node attribute (e.g., a State attribute, such as a PTP State attribute, that indicates the state of the node as holdover, acquiring, freerun, or locked); a transmission (Tx) class of the node attribute (e.g., a Tx clock class attribute, such as a PTP Tx clock class attribute, that indicates a transmission class of the node to child nodes); a reception (Rx) class of the node attribute (e.g., an Rx clock class attribute, such as a PTP Rx clock class attribute, that indicates a reception class of the node from parent nodes); an identifier of the GM device attribute (e.g., a GM-Clock-ID attribute, such as a PTP GM-Clock-ID attribute, that uniquely identifies the GM device); an identifier of a parent node of the node attribute (e.g., a Parent Clock-ID attribute, such as a PTP Parent Clock-ID attribute, that uniquely identifies the parent node of the node); a frequency traceability of the node attribute (e.g., a Frequency Traceability attribute, such as a PTP Frequency Traceability attribute, that indicates whether SyncE is present or not on the node); a time traceability of the node attribute (e.g., a Time Traceability attribute, such as a PTP Time Traceability attribute, that indicates whether a time source is traceable or not on the node); a phase offset of the node attribute (e.g., a Phase Offset attribute, such as a PTP Phase Offset attribute, that indicates a phase offset with respect to the parent node of the node); an asymmetry compensation of the node attribute (e.g., an Asymmetry Comp attribute, such as a PTP Asymmetry Comp attribute, that indicates any compensation due to asymmetry associated with the node, measured in ns); a node class of the node attribute (e.g., a Node Class-type attribute, such as a PTP Node Class-type attribute, that indicates a node class of the node, such as class A, class B, class C, or class D as defined by PTP); an Ethernet Synchronization Message Channel (ESMC) quality level (QL) attribute of the node (e.g., an ESMC-QL attribute, such as a ESMC-QL attribute, that indicates ESMCs of the node); a source port information of the node attribute (e.g., a Source-Port-ID-and-State attribute, such as a Source-Port-ID-and-State, that indicates an identifier and a state of each source port of the node); a SyncE state of the node attribute (e.g., a SyncE State attribute, such as a PTP SyncE State attribute, that indicates the state of the node as holdover, acquiring, freerun, or locked); a SyncE source information of the node attribute (e.g., a SyncE Source-Info attribute, such as a PTP SyncE SyncE Source-Info attribute, that indicates primary and secondary interface associated with the ESMCs of the node); and/or a master information of the node attribute (e.g., a Master-Info attribute, such as a PTP Master-Information attribute, that indicates which interfaces of the node that are associated with master clocks).

As shown in FIG. 1B, and by reference number 104, the monitoring system may determine relative time error information associated with a node, such as based on the reporting data obtained from the node. The monitoring system may process some or all of the reporting data to determine the relative time error information. For example, the monitoring system may process the one or more timestamps and/or the one or more time error measurements included in the reporting data to determine the relative time error information. The relative time error information provides a measurement of time error at an instant of time between a pair of nodes (e.g., between master and slave nodes) in the synchronization chain, which may not be directly comparable to an absolute time error with the source of time (e.g., the GM device). The relative time error information may include, for example, a forward time error associated with the node, a reverse time error associated with the node, a two-way time error associated with the node, a constant time error (cTE) associated with the node, and/or a maximum absolute time error (max|TE|) associated with the node.

As shown in FIG. 1C, and by reference number 106, the monitoring system may determine whether the node is associated with one or more time error performance issues (e.g., based on the reporting data and/or the relative time error information). The monitoring system may process some or all of the reporting data and/or some or all of the relative time error information to determine whether the node is associated with the one or more time error performance issues. The one or more time error performance issues may include, for example, a synchronous Ethernet (SyncE) transient time error performance issue, a loop time error performance issue, a coordinated universal time (UTC) offset time error performance issue, a parent node switchover time error performance issue, an abnormal timestamp time error performance issue, a reporting time error performance issue, a correction field (CF) time error performance issue, and/or a dynamic baselining time error performance issue, as described further herein.

In some implementations, the monitoring system may determine that the node is associated with a SyncE transient time error performance issue (e.g., a momentary time error performance issue due to a SyncE switchover at the node). For example, the monitoring system may determine (e.g., based on the relative time error information) that a two-way time error associated with the node has a first value at a first time and a second value at a second time, and that a difference between the first value and the second value satisfies (e.g., is greater than or equal to) a difference threshold. The difference threshold may be, for example, greater than or equal to a transient performance mask (e.g., as defined in ITU-T G.8275.1 profile), or any user defined threshold value. The monitoring system may thereby determine (e.g. based on the reporting data, such as based on the SyncE source information of the node attribute included in the reporting data), that the node is associated with a first SyncE interface at the first time and that the node is associated with a second SyncE interface at the second time. The monitoring system may therefore determine that the node is associated with a SyncE transient time error performance issue. Alternatively, the monitoring system may determine that the node is not associated with a SyncE transient time error performance issue when a difference between the first value and the second value does not satisfy (e.g., is less than) the difference threshold, or that the node is not associated with different SyncE interfaces at the first time and the second time.

In some implementations, the monitoring system may determine, after determining that the node is associated with a SyncE transient time error performance issue, that the node or is no longer associated with the SyncE transient time error performance issue based on determining that the two-way time error associated with the node has a third value at a third time and a fourth value at a fourth time, and that a difference between the third value and the fourth value does not satisfy (e.g., is less than) the difference threshold.

In some implementations, the monitoring system may determine that the node is associated with a loop time error performance issue (e.g., two or more nodes, of the plurality of nodes, rely on synchronization information from each other in the synchronization network). For example, the monitoring system may determine (e.g. based on the reporting data, such as based on the identifier of the node attribute and the identifier of the parent node of the node attribute included in the reporting data) a first identifier of the node and a second identifier of a parent node of the node. The monitoring system may also determine (e.g., based on other reporting data obtained by another node of the plurality of nodes), a third identifier of the other node and a fourth identifier of a parent node of the other node. The monitoring system may determine that the first identifier matches the fourth identifier (e.g., the first identifier and the fourth identifier are at least partially the same, or otherwise identify the same node) and that the second identifier matches the third identifier (e.g., the second identifier and the third identifier are at least partially the same, or otherwise identify the same node), and may thereby determine that the node is associated with a loop time error performance issue. That is, the monitoring system may determine that the node identifies the other node as a parent node of the node, and that the other node identifies the node as a parent node of the other node, and may thereby determine that the node is associated with a loop time error performance issue. Alternatively, when the monitoring system determines that the first identifier does not match the fourth identifier and/or that the second identifier does not match the third identifier, the monitoring system may determine that the node is not associated with a loop time error performance issue.

In some implementations, the monitoring system may determine that the node is associated with a UTC offset time error performance issue (e.g., there is an issue associated with time of day (TOD) seconds, or portion of seconds, calculated by the node as compared to one or more other nodes of the plurality of nodes in the synchronization network). For example, the monitoring system may determine (e.g., based on the reporting data) a first timestamp of a first time period (e.g., the first timestamp is within a start time and an end time of the first time period, which is determined by the monitoring system) associated with synchronization communications between the node and a first other node of the plurality of nodes, a second timestamp of a second time period (e.g., that is determined by the monitoring system) associated with the synchronization communications, and a third timestamp of a third time period (e.g., that is determined by the monitoring system) associated with the synchronization communications. The monitoring system may also determine (e.g., based on other reporting data obtained by the first other node) a fourth timestamp of the first time period associated with other synchronization communications between the first other node and a second other node of the plurality of nodes, a fifth timestamp of the second time period associated with the other synchronization communications, and a sixth timestamp of the third time period associated with the other synchronization communications. The monitoring system may determine a first difference between the first timestamp and the fourth timestamp, a second difference between the second timestamp and the fifth timestamp, and a third difference between the third timestamp and the sixth time stamp. The monitoring system may determine that the first difference, the second difference, and the third difference are each greater than or equal to a difference threshold, and may thereby determine that the node is associated with a UTC offset time error performance issue. That is, the monitoring system may determine an inconsistency in timestamp reporting by the node across multiple time periods (e.g., due to differences that are greater than or equal to the difference threshold), as compared to timestamp reporting by the first other node.

In some implementations, the monitoring system may determine that the node is associated with a parent node switchover time error performance issue (e.g., there is an issue associated with switchover from one parent node to another parent node). For example, the monitoring system may determine (e.g., based on the reporting data, such as based on the identifier of the parent node of the node attribute included in the reporting data), a first identifier of a first parent node of the node at a first time and a second identifier of a second parent node of the node at a second time. The monitoring system may determine that the first identifier does not match the second identifier (e.g., the first identifier is not the same as the second identifier, or the identifiers otherwise identify different parent nodes) and may thereby determining that the node is associated with a parent node switchover time error performance issue.

In some implementations, the monitoring system may determine that the node is associated with an abnormal timestamp time error performance issue (e.g., there is an issue associated with timestamps included in the reporting data, such as timestamps associated with large, or varying, time offsets). For example, the monitoring system may identify (e.g., based on the reporting data) one or more timestamps associated with synchronization communications between the node and another node of the plurality of nodes. The monitoring system may process, using one or more analysis techniques (e.g., one or more time error analysis techniques), the one or more timestamps to determine that the node is associated with an abnormal timestamp time error performance issue.

In some implementations, the monitoring system may determine that the node is associated with a reporting time error performance issue (e.g., there is an issue associated with packets, such as PTP packets, of the reporting data being transmitted to, or received by, the monitoring system). For example, the monitoring system may determine, based on the reporting data, one or more reporting parameters associated with the node (e.g., a packet transmission rate, a packet drop rate, and/or another reporting parameter), and may thereby determine that the node is associated with a reporting time error performance issue.

In some implementations, the monitoring system may determine that the node is associated with a CF time error performance issue (e.g., there is an issue with a CF value of packets, such as PTP packets, exchanged between the node and another node as part of synchronization communications). For example, the monitoring system may determine (e.g., using one or more analysis techniques and based on the reporting data, such as a phase offset of the node attribute included in the reporting data) one or more CF values associated with synchronization communications between the node and the other node, and may thereby determine that the node is associated with a CF time error performance issue.

In some implementations, the monitoring system may determine that the node is associated with a dynamic baselining time error performance issue (e.g., there is an issue with a time error, such as a cTE, of the node falling outside a predicted time error range). For example, the monitoring system may determine a dynamic baseline for a time error associated with the node (e.g., the dynamic baseline indicates a predicted value of the time error at a particular time, a maximum predicted value of the time error at the particular time, and a minimum predicted value of the time error at the particular time, as further described herein in relation to FIG. 1D). The monitoring system may determine (e.g., based on the reporting data and/or the relative time error information) a value of the time error at the particular time, and may determine whether the value of the time error is greater than the maximum predicted value of the time error, or that the value of the time error is less than the minimum predicted value of the time error. Accordingly, based on a positive determination, the monitoring system may determine that the node is associated with a dynamic baselining time error performance issue. Alternatively, based on a negative determination, the monitoring system may determine that the node is not associated with a dynamic baselining time error performance issue.

As further shown in FIG. 1C, and by reference number 108, the monitoring system may provide information indicating whether the node is associated with one or more time error performance issues. For example, the monitoring system may provide information indicating the one or more time error performance issues (e.g., based on determining that the node is associated with the one or more time error performance issues). Alternatively, the monitoring system may provide information indicating the no time error performance issues (e.g., based on determining that the node is not associated with the one or more time error performance issues).

To provide the information, the monitoring system may send the information indicating whether the node is associated with one or more time error performance issues to another device, such as the client device. This may allow the client device to present (e.g., visually, audibly, and/or tactilely), such as via a presentation component of the client device (e.g., a display screen, a speaker, and/or a haptic feedback device), the information indicating whether the node is associated with the one or more time error performance issues. For example, the client device may display, on the display screen of the client device, the information indicating whether the node is associated with the one or more time error performance issues and/or an alert associated with the information indicating whether the node is associated with the one or more time error performance issues.

In some implementations, the monitoring system may provide other information (e.g., to another device, such as the client device). For example, the monitoring system may determine (e.g., based on the reporting data, such as at least one of the one or more synchronization attributes included in the reporting data) a topology of the plurality of nodes in the synchronization network, and may provide information indicating the topology of the plurality of nodes in the synchronization network. As another example, the monitoring system may determine (e.g., based on the relative time error information) a time error associated with the node, and may determine (e.g., based on relative time error information obtained from one or more other nodes of the plurality of nodes) respective time errors associated with the one or more other nodes. The monitoring system may determine, based on the time error associated with the node and the respective time errors associated with the one or more other nodes, a cumulative time error associated with the synchronization network (e.g., a combination of the time error and the respective time errors, such as a sum, that indicates a cumulative relative time error of the node and the one or more other nodes), and may provide information indicating the cumulative time error associated with the synchronization network.

Figure 1D:
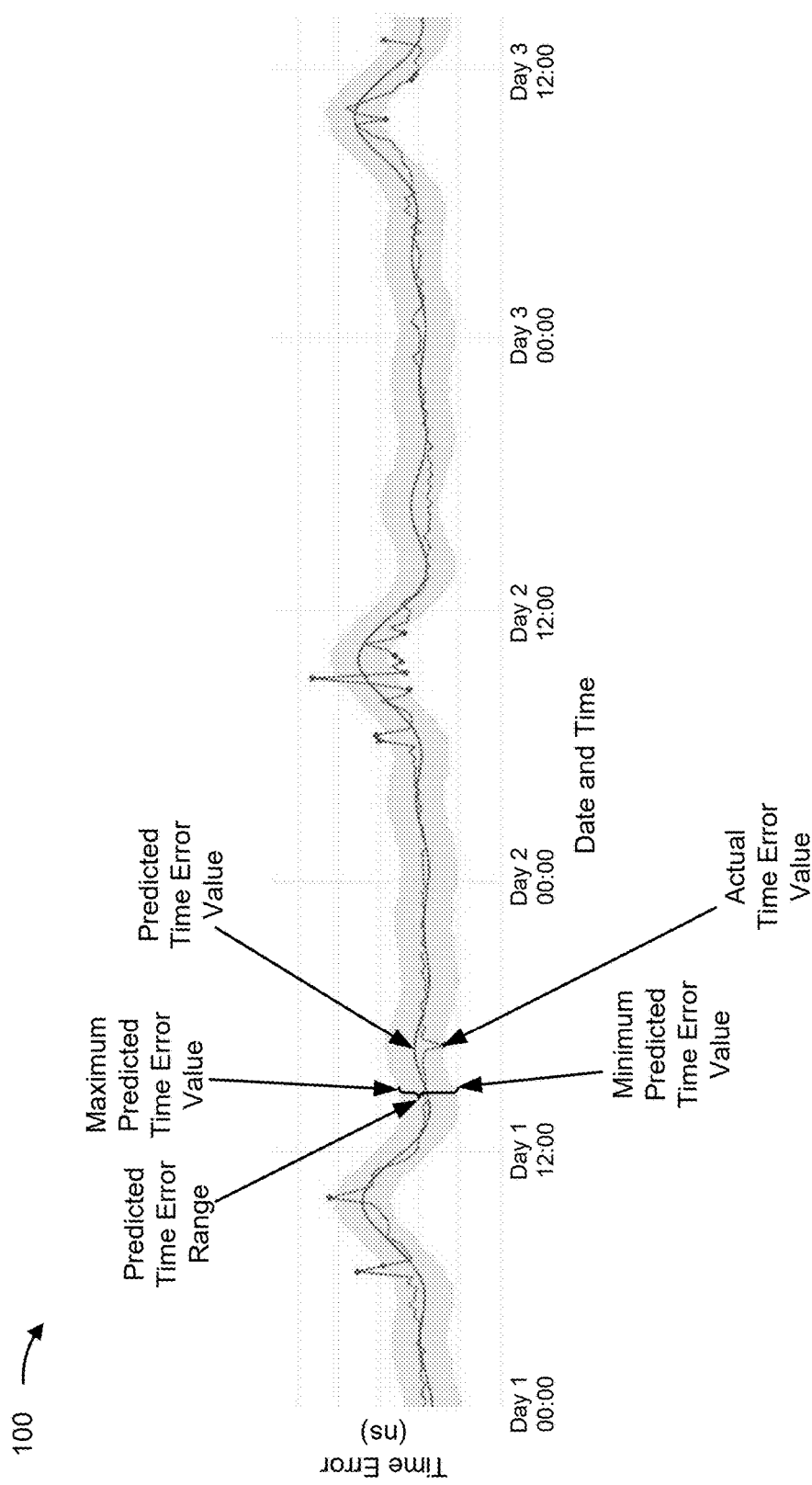

FIG. 1D shows an example dynamic baseline for a time error (e.g., a cTE) associated with a node (e.g., of the plurality of nodes of the synchronization network). The dynamic baseline may be a prediction of future time error values, and may be based on historical time error values (e.g., of the node and/or one or more other nodes of the plurality of nodes). For example, the monitoring system may use a machine learning model (e.g., a long short-term memory (LSTM) model, and/or another machine learning model) to process historical time error values to predict future time error values. Accordingly, for a particular time, the dynamic baseline indicates a predicted time error value and a predicted time error range. The predicted time error range may have a minimum predicted time error value and a maximum predicted time error value, and the predicted time error value may be within the predicted time error range (e.g., greater than or equal to the minimum predicted time error value and less than or equal to the maximum predicted time error value). Accordingly, the monitoring system may determine, for the particular time, whether the time error (e.g., an actual time error value at the particular time, as determined by the monitoring system) is within the predicted time error range. When the monitoring system determines that the time error is not within the predicted time error range, the monitoring system may determine that the node is associated with a dynamic baselining time error performance issue (e.g., as described herein). Alternatively, when the monitoring system determines that the time error is within the predicted time error range, the monitoring system may determine that the node is not associated with a dynamic baselining time error performance issue.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
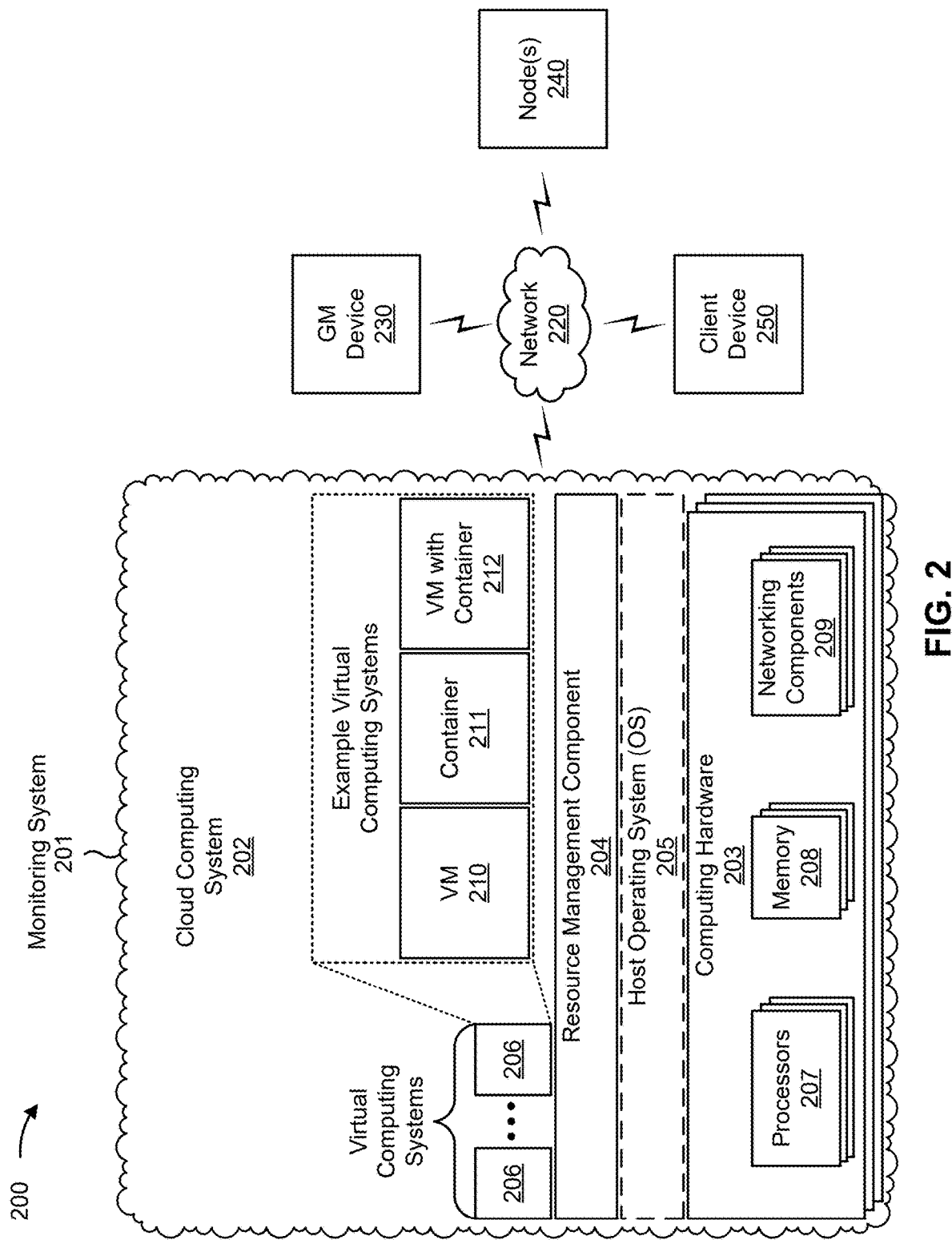
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a monitoring system 201, which may include one or more elements of and/or may execute within a cloud computing system 202. The cloud computing system 202 may include one or more elements 203-212, as described in more detail below. As further shown in FIG. 2, environment 200 may include a network 220, a GM device 230, one or more nodes 240, and a client device 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211 (e.g., that comprise one or more threads). In some implementations, the resource management component 204 executes within and/or in coordination with a host operating system 205. In some implementations, the resource management component 204 includes the intent server module, the profile comparators module, the intent translator module, and/or the intent analysis engine module described herein in relation to FIG. 1.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the monitoring system 201 may include one or more elements 203-212 of the cloud computing system 202, may execute within the cloud computing system 202, and/or may be hosted within the cloud computing system 202, in some implementations, the monitoring system 201 may not be cloud-based (e.g., may be implemented outside of a cloud computing system) or may be partially cloud-based. For example, the monitoring system 201 may include one or more devices that are not part of the cloud computing system 202, such as device 300 of FIG. 3 and/or device 400 of FIG.

4, which may include a standalone server or another type of computing device. The monitoring system 201 may perform one or more operations and/or processes described in more detail elsewhere herein.

Network 220 is a synchronization network and includes one or more wired and/or wireless networks, and. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

GM device 230 includes one or more devices capable of receiving, generating, storing, processing, and/or providing timing information, such as master clock information. In some implementations, network GM device 230 may receive timing information for the network from one or more of a global positioning system receiver, an atomic clock, another device that receives timing information from a timing source, and/or the like.

Node 240 includes one or more devices capable of receiving, processing, storing, routing, and/or providing information in a manner described herein. For example, node 240 may include a router, such as a label switching router (LSR), a label edge router (LER), an ingress router, an egress router, a provider router (e.g., a provider edge router or a provider core router), a virtual router, or another type of router. Additionally, or alternatively, node 240 may include a gateway, a switch, a firewall, a hub, a bridge, a reverse proxy, a server (e.g., a proxy server, a cloud server, or a data center server), a load balancer, and/or a similar device. In some implementations, node 240 may be a GM clock-type node, a BC-type node, an OC-type node, or a similar type of device. In some implementations, node 240 may be a physical device implemented within a housing, such as a chassis. In some implementations, node 240 may be a virtual device implemented by one or more computer devices of a cloud computing environment or a data center. Node 240 may include a remote radio transceiver that connects to an operator radio control panel via an electrical interface or a wireless interface. Node 240 may include radio frequency (RF) circuitry, analog-to-digital/digital-to-analog converters, and/or up/down converters.

Client device 250 includes one or more devices capable of receiving, generating, storing, processing, and/or providing information, as described herein. For example, client device 250 may include a communication and/or computing device, such as a customer edge device (CE device), a switch, a router, a mobile phone (e.g., a smart phone, a radiotelephone, etc.), a laptop computer, a tablet computer, a handheld computer, a desktop computer, a server, a set-top box, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
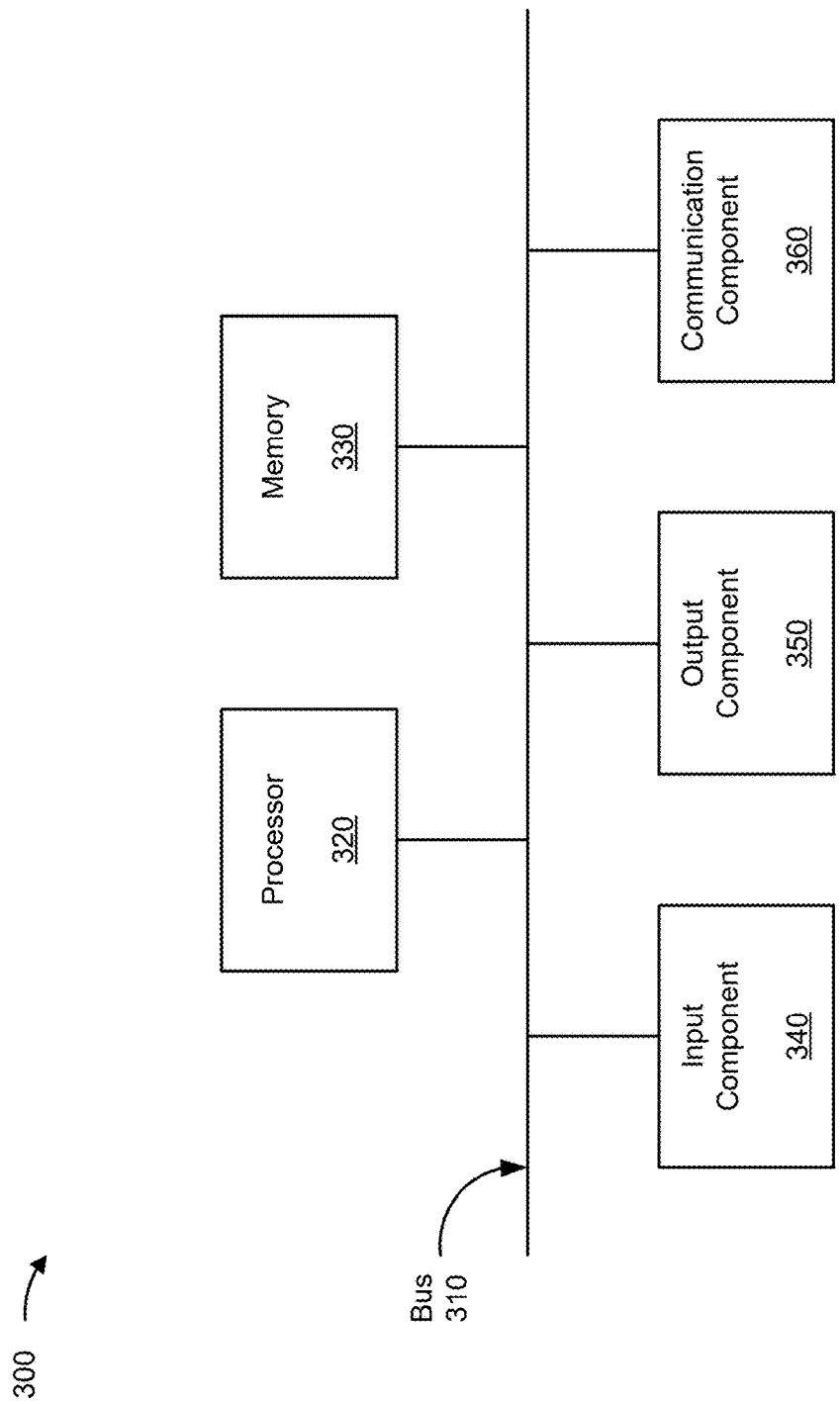
FIGS. 3-4 are diagrams of example components of a device described herein.

FIG. 3 is a diagram of example components of a device 300, which may correspond to monitoring system 201, computing hardware 203, GM device 230, node 240, and/or client device 250. In some implementations, monitoring system 201, computing hardware 203, GM device 230, node 240, and/or client device 250 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
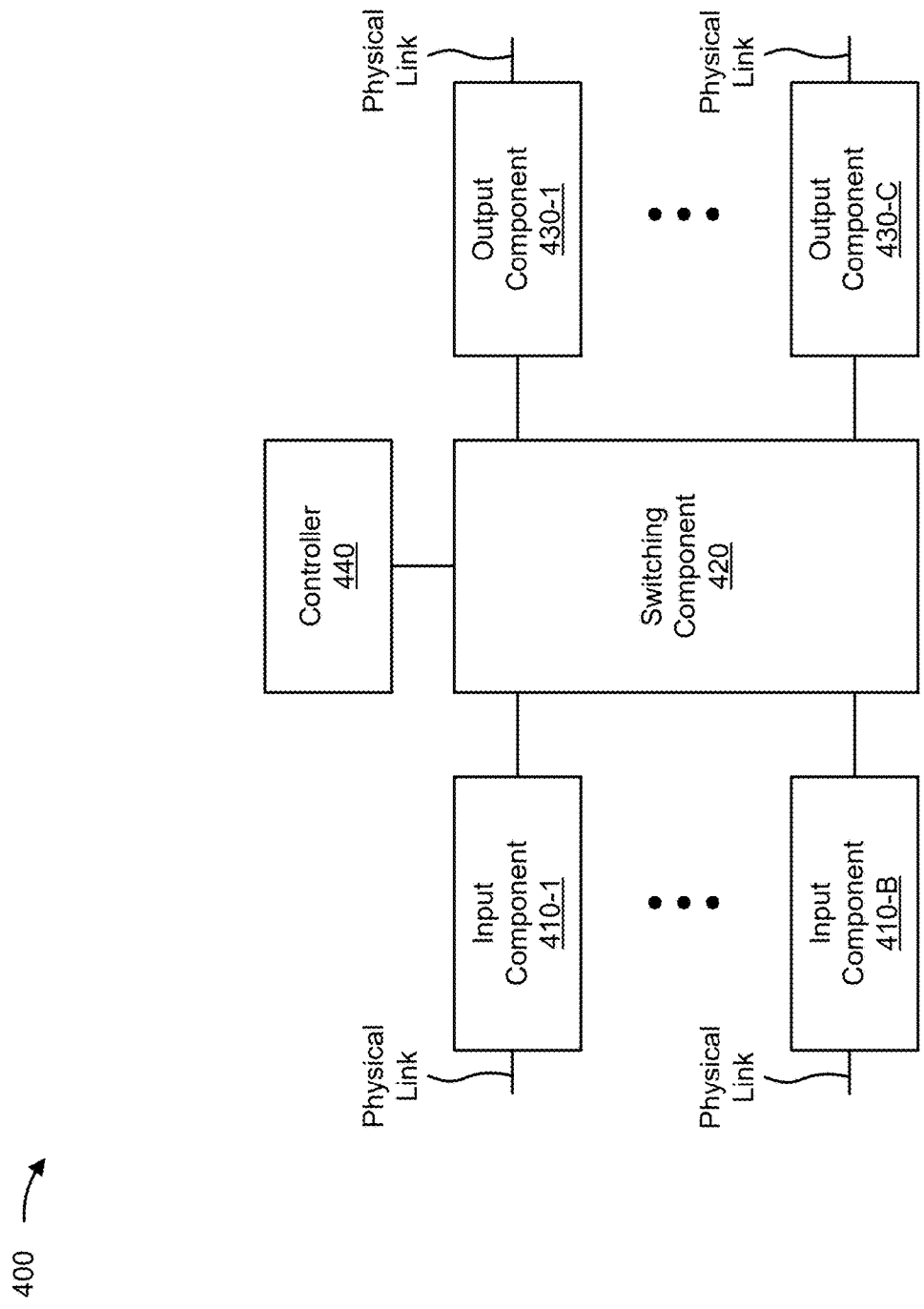

FIG. 4 is a diagram of example components of a device 400. Device 400 may correspond to monitoring system 201, computing hardware 203, GM device 230, node 240, and/or client device 250. In some implementations, monitoring system 201, computing hardware 203, GM device 230, node 240, and/or client device 250 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
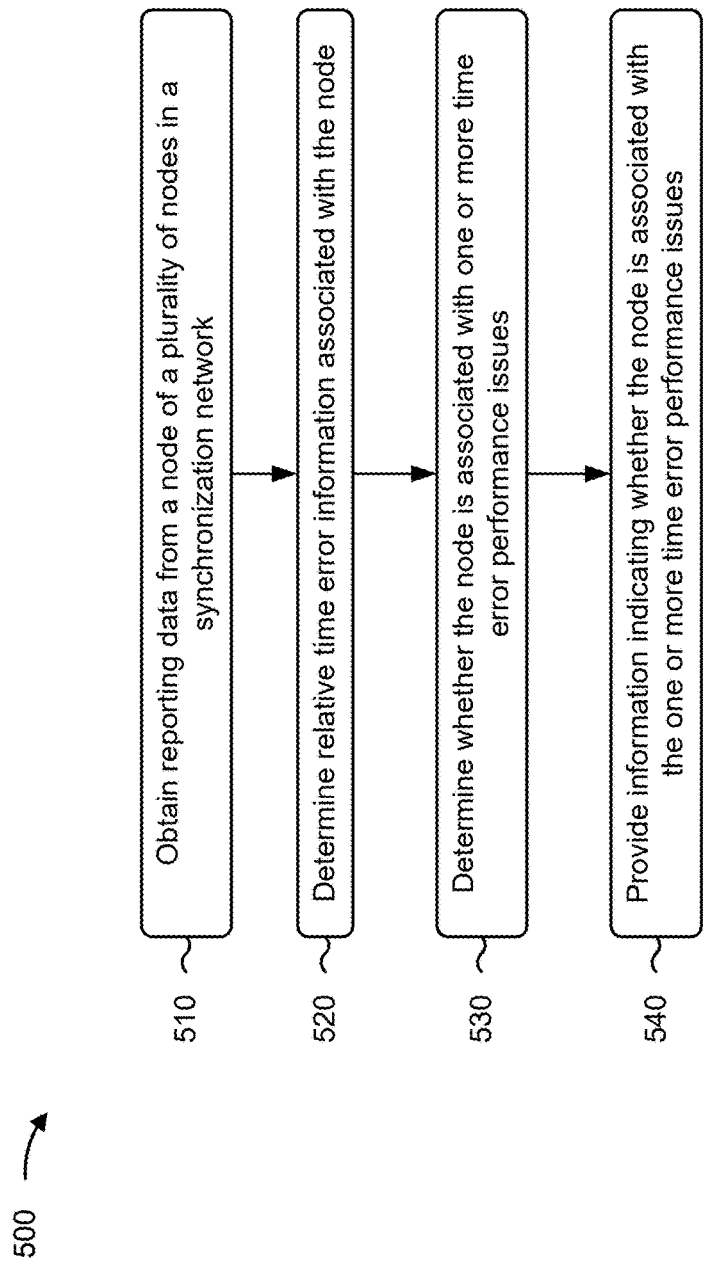
FIG. 5 is a flowchart of an example process associated with dynamically determining time error performance issues in a synchronization network by a monitoring system.

FIG. 5 is a flowchart of an example process 500 associated with dynamically determining time error performance issues in a synchronization network by a monitoring system. In some implementations, one or more process blocks of FIG. 5 are performed by a monitoring system (e.g., the monitoring system 201). In some implementations, one or more process blocks of FIG. 5 are performed by another device or a group of devices separate from or including the monitoring system, such as a node (e.g., the node 240) and/or a client device (e.g., the client device 250). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or another device.

As shown in FIG. 5, process 500 may include obtaining reporting data from a node of a plurality of nodes in a synchronization network (block 510). For example, the monitoring system may obtain reporting data from a node of a plurality of nodes in a synchronization network, as described above.

As further shown in FIG. 5, process 500 may include determining relative time error information associated with the node (block 520). For example, the monitoring system may determine, based on the reporting data, relative time error information associated with the node, as described above.

As further shown in FIG. 5, process 500 may include determining whether the node is associated with one or more time error performance issues (block 530). For example, the monitoring system may determine, based on at least one of the reporting data or the relative time error information, whether the node is associated with one or more time error performance issues, as described above.

As further shown in FIG. 5, process 500 may include providing information indicating whether the node is associated with the one or more time error performance issues (block 540). For example, the monitoring system may provide information indicating whether the node is associated with the one or more time error performance issues, as described above.

Process 500 may include additional implementations, such as any single implementation or any combination of implementations described below and/or in connection with one or more other processes described elsewhere herein.

In a first implementation, the reporting data indicates at least one of one or more timestamps associated with synchronization communications between the node and another node of the plurality of nodes, one or more time error measurements associated with the synchronization communications, or one or more synchronization attributes associated with the node.

In a second implementation, alone or in combination with the first implementation, the relative time error information includes at least one of a forward time error associated with the node, a reverse time error associated with the node, a two-way time error associated with the node, a constant time error associated with the node, or a maximum absolute time error associated with the node.

In a third implementation, alone or in combination with one or more of the first and second implementations, determining that the node is associated with the one or more time error performance issues comprises determining, based on the relative time error information, that a two-way time error associated with the node has a first value at a first time and a second value at a second time; determining that a difference between the first value and the second value is greater than or equal to a difference threshold; determining, based on determining that the difference is greater than or equal to the difference threshold and based on the reporting data, that the node is associated with a first SyncE interface at the first time and that the node is associated with a second SyncE interface at the second time; and determining, based on determining that the node is associated with the first SyncE interface at the first time and that the node is associated with second SyncE interface at the second time, that the node is associated with a SyncE transient time error performance issue.

In a fourth implementation, alone or in combination with one or more of the first through third implementations, determining that the node is associated with the one or more time error performance issues comprises determining, based on the reporting data, a first identifier of the node and a second identifier of a parent node of the node; determining, based on other reporting data obtained by another node, of the plurality of nodes, a third identifier of the other node and a fourth identifier of a parent node of the other node; determining that the first identifier matches the fourth identifier and that the second identifier matches the third identifier; and determining, based on determining that the first identifier matches the fourth identifier and that the second identifier matches the third identifier, that the node is associated with a loop time error performance issue.

In a fifth implementation, alone or in combination with one or more of the first through fourth implementations, determining that the node is associated with the one or more time error performance issues comprises determining, based on the reporting data, a first timestamp of a first time period associated with synchronization communications between the node and a first other node of the plurality of nodes, a second timestamp of a second time period associated with the synchronization communications, and a third timestamp of a third time period associated with the synchronization communications; determining, based on other reporting data obtained by the first other node, a fourth timestamp of the first time period associated with other synchronization communications between the first other node and a second other node of the plurality of nodes, a fifth timestamp of the second time period associated with the other synchronization communications, and a sixth timestamp of the third time period associated with the other synchronization communications; determining a first difference between the first timestamp and the fourth timestamp, a second difference between the second timestamp and the fifth timestamp, and a third difference between the third timestamp and the sixth time stamp, determining that the first difference, the second difference, and the third difference are each greater than or equal to a difference threshold; and determining, based on determining that the first difference, the second difference, and the third difference are each greater than or equal to the difference threshold, that the node is associated with a coordinated universal time (UTC) offset time error performance issue.

In a sixth implementation, alone or in combination with one or more of the first through fifth implementations, determining that the node is associated with the one or more time error performance issues comprises determining, based on the reporting data, a first identifier of a first parent node of the node at a first time and a second identifier of a second parent node of the node at a second time; determining that the first identifier does not match the second identifier; and determining, based on determining that the first identifier does not match the second identifier, that the node is associated with a parent node switchover time error performance issue.

In a seventh implementation, alone or in combination with one or more of the first through sixth implementations, determining that the node is associated with the one or more time error performance issues comprises identifying, based on the reporting data, one or more timestamps associated with synchronization communications between the node and another node of the plurality of nodes, and processing, using one or more analysis techniques, the one or more timestamps to determine that the node is associated with an abnormal timestamp time error performance issue.

In an eighth implementation, alone or in combination with one or more of the first through seventh implementations, determining that the node is associated with the one or more time error performance issues comprises determining, based on the reporting data, one or more reporting parameters associated with the node, and determining, based on the one or more reporting parameters, that the node is associated with a reporting time error performance issue.

In a ninth implementation, alone or in combination with one or more of the first through eighth implementations, determining that the node is associated with the one or more time error performance issues comprises determining, based on the reporting data, one or more CF values associated with synchronization communications between the node and another node, and determining, based on the one or more CF fields, that the node is associated with a CF time error performance issue.

In a tenth implementation, alone or in combination with one or more of the first through ninth implementations, determining that the node is associated with the one or more time error performance issues comprises determining a dynamic baseline for a time error associated with the node, wherein the dynamic baseline indicates a predicted value of the time error at a particular time, a maximum predicted value of the time error at the particular time, and a minimum predicted value of the time error at the particular time; determining, based on at least one of the reporting data or the relative time error information, a value of the time error at the particular time; determining that the value of the time error is greater than the maximum predicted value of the time error, or that the value of the time error is less than the minimum predicted value of the time error; and determining, based on determining that the value of the time error is greater than the maximum predicted value of the time error, or that the value of the time error is less than the minimum predicted value of the time error, that the node is associated with a dynamic baselining time error performance issue.

In an eleventh implementation, alone or in combination with one or more of the first through tenth implementations, providing the information indicating whether the node is associated with the one or more time error performance issues includes sending, to a client device, the information indicating whether the node is associated with the one or more time error performance issues. Sending, to the client device, the information indicating whether the node is associated with the one or more time error performance issues, allows the client device to display, on a display screen of the client device, the information indicating whether the node is associated with the one or more time error performance issues, and/or allows the client device to present, via a presentation component of the client device, an alert associated with the information indicating whether the node is associated with the one or more time error performance issues.

In a twelfth implementation, alone or in combination with one or more of the first through eleventh implementations, process 500 includes determining, based on the reporting data, a topology of the plurality of nodes in the synchronization network, and providing information indicating the topology of the plurality of nodes in the synchronization network.

In a thirteenth implementation, alone or in combination with one or more of the first through twelfth implementations, process 500 includes determining, based on the relative time error information, a time error associated with the node; determining, based on other relative time error information obtained from one or more other nodes of the plurality of nodes, respective time errors associated with the one or more other nodes; determining, based on the time error associated with the node and the respective time errors associated with the one or more other nodes, a cumulative time error associated with the synchronization network; and providing information indicating the cumulative time error associated with the synchronization network.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
obtaining, by a monitoring system, reporting data from a node of a plurality of nodes in a synchronization network;
determining, by the monitoring system and based on the reporting data, relative time error information associated with the node;
determining, by the monitoring system and based on at least one of the reporting data or the relative time error information, that the node is associated with one or more time error performance issues,
wherein determining that the node is associated with the one or more time error performance issues comprises:
determining, based on the reporting data, a first identifier of a first parent node of the node at a first time and a second identifier of a second parent node of the node at a second time;
determining that the first identifier does not match the second identifier; and
determining, based on determining that the first identifier does not match the second identifier, that the node is associated with a parent node switchover time error performance issue; and
providing, by the monitoring system, information indicating the one or more time error performance issues.

2. The method of claim 1, wherein the reporting data indicates at least one of:
one or more timestamps associated with synchronization communications between the node and another node of the plurality of nodes;
one or more time error measurements associated with the synchronization communications; or
one or more synchronization attributes associated with the node.

3. The method of claim 1, wherein the relative time error information includes at least one of:
a forward time error associated with the node;
a reverse time error associated with the node;
a two-way time error associated with the node;
a constant time error associated with the node; or
a maximum absolute time error associated with the node.

4. The method of claim 1, wherein determining that the node is associated with the one or more time error performance issues comprises:
determining, based on the relative time error information, that a two-way time error associated with the node has a first value at a first time and a second value at a second time;
determining that a difference between the first value and the second value is greater than or equal to a difference threshold;
determining, based on determining that the difference is greater than or equal to the difference threshold and based on the reporting data, that the node is associated with a first synchronous Ethernet (SyncE) interface at the first time and that the node is associated with a second SyncE interface at the second time; and
determining, based on determining that the node is associated with the first SyncE interface at the first time and that the node is associated with second SyncE interface at the second time, that the node is associated with a SyncE transient time error performance issue.

5. The method of claim 1, wherein determining that the node is associated with the one or more time error performance issues comprises:
determining, based on the reporting data, a first identifier of the node and a second identifier of a parent node of the node;
determining, based on other reporting data obtained by another node, of the plurality of nodes, a third identifier of the other node and a fourth identifier of a parent node of the other node;
determining that the first identifier matches the fourth identifier and that the second identifier matches the third identifier; and
determining, based on determining that the first identifier matches the fourth identifier and that the second identifier matches the third identifier, that the node is associated with a loop time error performance issue.

6. The method of claim 1, wherein determining that the node is associated with the one or more time error performance issues comprises:
determining, based on the reporting data, a first timestamp of a first time period associated with synchronization communications between the node and a first other node of the plurality of nodes, a second timestamp of a second time period associated with the synchronization communications, and a third timestamp of a third time period associated with the synchronization communications;
determining, based on other reporting data obtained by the first other node, a fourth timestamp of the first time period associated with other synchronization communications between the first other node and a second other node of the plurality of nodes, a fifth timestamp of the second time period associated with the other synchronization communications, and a sixth timestamp of the third time period associated with the other synchronization communications; determining a first difference between the first timestamp and the fourth timestamp, a second difference between the second timestamp and the fifth timestamp, and a third difference between the third timestamp and the sixth timestamp;
determining that the first difference, the second difference, and the third difference are each greater than or equal to a difference threshold; and
determining, based on determining that the first difference, the second difference, and the third difference are each greater than or equal to the difference threshold, that the node is associated with a coordinated universal time (UTC) offset time error performance issue.

7. The method of claim 1, wherein determining that the node is associated with the one or more time error performance issues comprises:
identifying, based on the reporting data, one or more timestamps associated with synchronization communications between the node and another node of the plurality of nodes; and
processing, using one or more analysis techniques, the one or more timestamps to determine that the node is associated with an abnormal timestamp time error performance issue.

8. The method of claim 1, wherein determining that the node is associated with the one or more time error performance issues comprises:

determining, based on the reporting data, one or more reporting parameters associated with the node; and determining, based on the one or more reporting parameters, that the node is associated with a reporting time error performance issue.

9. The method of claim 1, wherein determining that the node is associated with the one or more time error performance issues comprises:

determining, based on the reporting data, one or more correction field (CF) values associated with synchronization communications between the node and another node; and determining, based on the one or more CF fields, that the node is associated with a CF time error performance issue.

10. The method of claim 1, wherein determining that the node is associated with the one or more time error performance issues comprises:

determining a dynamic baseline for a time error associated with the node, wherein the dynamic baseline indicates a predicted value of the time error at a particular time, a maximum predicted value of the time error at the particular time, and a minimum predicted value of the time error at the particular time;

determining, based on at least one of the reporting data or the relative time error information, a value of the time error at the particular time;

determining that the value of the time error is greater than the maximum predicted value of the time error, or that the value of the time error is less than the minimum predicted value of the time error; and determining, based on determining that the value of the time error is greater than the maximum predicted value of the time error, or that the value of the time error is less than the minimum predicted value of the time error, that the node is associated with a dynamic baselining time error performance issue.

11. A monitoring system, comprising:

one or more memories; and one or more processors to:

obtain reporting data from a node of a plurality of nodes in a synchronization network;

determine relative time error information associated with the node;

determine, based on at least one of the reporting data or the relative time error information, whether the node is associated with one or more time error performance issues, wherein the one or more processors, when determining that the node is associated with the one or more time error performance issues, are further to:

determine, based on the reporting data, a first identifier of a first parent node of the node at a first time and a second identifier of a second parent node of the node at a second time;

determine that the first identifier does not match the second identifier; and determine, based on determining that the first identifier does not match the second identifier, that the node is associated with a parent node switchover time error performance issue; and provide information indicating whether the node is associated with the one or more time error performance issues.

12. The monitoring system of claim 11, wherein the one or more processors, to provide the information indicating whether the node is associated with the one or more time error performance issues, are to:

send, to a client device, the information indicating whether the node is associated with the one or more time error performance issues, wherein sending, to the client device, the information indicating whether the node is associated with the one or more time error performance issues, allows the client device to display, on a display screen of the client device, the information indicating whether the node is associated with the one or more time error performance issues.

13. The monitoring system of claim 11, wherein the one or more processors are further to:

determine, based on the reporting data, a topology of the plurality of nodes in the synchronization network; and provide information indicating the topology of the plurality of nodes in the synchronization network.

14. The monitoring system of claim 11, wherein the one or more processors are further to:

determine, based on the relative time error information, a time error associated with the node;

determine, based on other relative time error information obtained from one or more other nodes of the plurality of nodes, respective time errors associated with the one or more other nodes;

determine, based on the time error associated with the node and the respective time errors associated with the one or more other nodes, a cumulative time error associated with the synchronization network; and provide information indicating the cumulative time error associated with the synchronization network.

15. The monitoring system of claim 11, wherein the one or more time error performance issues include at least one of:

a synchronous Ethernet transient time error performance issue;

a loop time error performance issue;

a coordinated universal time (UTC) offset time error performance issue;

a parent node switchover time error performance issue;

an abnormal timestamp time error performance issue;

a reporting time error performance issue;

a correction field time error performance issue; or a dynamic baselining time error performance issue.

16. A non-transitory computer-readable medium storing a set of instructions, the set of instructions comprising:

one or more instructions that, when executed by one or more processors of a monitoring system, cause the monitoring system to:

obtain reporting data from a node of a plurality of nodes in a synchronization network;

determine, based on the reporting data, whether the node is associated with one or more time error performance issues, wherein the one or more instructions, that cause the monitoring system to determine that the node is associated with the one or more time error performance issues, cause the monitoring system to:

determine, based on the reporting data, a first identifier of a first parent node of the node at a first time and a second identifier of a second parent node of the node at a second time;

determine that the first identifier does not match the second identifier; and determine, based on determining that the first identifier does not match the second identifier, that the node is associated with a parent node switchover time error performance issue; and provide information indicating whether the node is associated with the one or more time error performance issues.

17. The non-transitory computer-readable medium of claim 16, wherein the one or more instructions, that cause the monitoring system to determine whether the node is associated with one or more time error performance issues, cause the monitoring system to:

determine, based on the reporting data, that the node is associated with at least one of:

a loop time error performance issue;

a coordinated universal time (UTC) offset time error performance issue;

a parent node switchover time error performance issue;

an abnormal timestamp time error performance issue;

a reporting time error performance issue; or a correction field time error performance issue.

18. The non-transitory computer-readable medium of claim 16, wherein the one or more instructions, that cause the monitoring system to determine whether the node is associated with one or more time error performance issues, cause the monitoring system to:

determine, based on the reporting data, relative time error information associated with the node; and determine, based on the relative time error information, that the node is associated with at least one of:

a synchronous Ethernet transient time error performance issue; or a dynamic baselining time error performance issue.

19. The non-transitory computer-readable medium of claim 16, wherein the one or more instructions, that cause the monitoring system to provide the information indicating whether the node is associated with the one or more time error performance issues, cause the monitoring system to:

send, to a client device, the information indicating whether the node is associated with the one or more time error performance issues, wherein sending, to the client device, the information indicating whether the node is associated with the one or more time error performance issues, allows the client device to present, via a presentation component of the client device, an alert associated with the information indicating whether the node is associated with the one or more time error performance issues.

20. The non-transitory computer-readable medium of claim 16, wherein the reporting data indicates at least one of:

one or more timestamps associated with synchronization communications between the node and another node of the plurality of nodes;

one or more time error measurements associated with the synchronization communications; or one or more synchronization attributes associated with the node.

* * * * *